Feb. 27, 1945.  J. HERMAN  2,370,312

SELF-RELEASING HOISTING HOOK

Filed July 17, 1944  2 Sheets-Sheet 1

Jack Herman INVENTOR.

BY Loyd J. Miller

Patented Feb. 27, 1945

2,370,312

UNITED STATES PATENT OFFICE 2,370,312

SELF-RELEASING HOISTING HOOK

Jack Herman, Oklahoma City, Okla.

Application July 17, 1944, Serial No. 545,327

9 Claims. (Cl. 294—82)

The invention relates to hoisting apparatus and has for its principal object the provision of a hoisting hook or grapple attached to a hoisting line, and adapted to be readily applied to an article to be hoisted. The hook has spring means for normally holding it in disengaging position, the spring means being adapted to be flexed to permit the hook to swing into an engaging or lifting position. The arrangement of parts is such that the weight of the article holds the hook in lifting position until the article is deposited on a support, at which time the spring means reacts to remove the hook into disengaging position and permits automatic release of the article.

A further object is to provide an attachment for a self-releasing hoisting hook which attachment will adapt the hook for releasably handling bulky objects such as lumber, pipe, or other objects which are not provided with a bail or loop for engagement to the hook.

Another object is to provide a hoisting hook so designed that when it is placed under a bail, or other loop, and is thereafter picked up by the line, the weight of the supported object will move the hook into a cocked position so that when the object is set down the spring will automatically swing the hook from beneath the bail or loop.

Other objects will be apparent from the following description when taken into connection with the accompanying two-sheet drawings, wherein.

Like characters of reference designate like parts in all the figures.

In the drawings.

Figure 2:
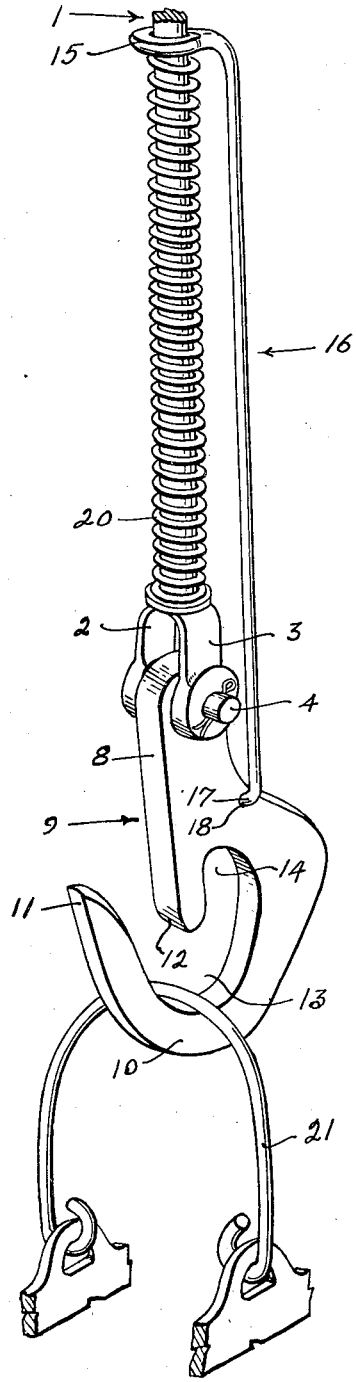
Figure 2 is a fragmentary perspective view showing all but the upper end of the device, the hook and its associated movable parts being shown in their load supporting positions.

The reference numeral 1, indicates, as a whole, an elongated rod or body having its lower end bifurcated to form two similar spaced depending legs 2 and 3, which are alignedly perforated horizontally to receive a pivot pin 4. The upper end of the body 1 is threaded to receive a retaining nut 5 and a locknut 6, the two of which act to retain a swivelly mounted line engaging loop member 7, whereby the device may be operatively supported by a usual hoisting line, not shown.

Pivotally mounted upon the pivot pin 4 between the legs 2 and 3, is a shank 8 of a load engaging hook indicated as a whole by the reference numeral 9. The hook 9 includes an arcuate portion or bill 10 formed as an integral part or extension of the shank 8, and the free end 11 of which extends somewhat towards the pivoted end of the shank 8. The shank 8 has an integral extension 12 which projects a short distance into the space 13 formed by the arcuate portion 10. The extension 12 forms, with the portion 10 a notch 14, the office of which will be more fully described hereinbelow.

Slidably surrounding the upper portion of the body 1, beneath the loop 7 is an eye 15, and the eye 15 is an integral portion of a link 16 which extends downwardly along the body 1. The extreme lower end portion 17 of the link 16 is bent laterally toward the hook 9 and is inserted through a lateral perforation 18 in the hook.

A helical spring 20 surrounds the body 1 beneath the eye 15, and rests upon the upper portions of the legs 2 and 3 where they join the body 1. The spring 20 acts to normally force the eye 15 upwardly along the body 1. It is obvious that when the eye 15 is urged to the upper end of its travel, the link 16 is also forced upwardly, and consequently, the hook 9 is drawn upwardly to the position illustrated in Figs. 1 and 3. When the hook 9 is in this position, the extension 12 thereof points in a slightly upward direction.

The mechanism of the device thus far described is primarily designed to engage and releasably support loads or objects having bails or loops. For illustrative purposes, Figs. 1 and 2 illustrate the device as it appears when operating in connection with a usual bucket bail 21.

In operation, the bail 21 is placed over the extension 12 and into the notch 14 while the weight of the bucket is resting upon a support, such as the ground or floor. When the device is thereafter picked up by the hoisting line, the weight of the bucket and its contents overcomes the resisting of the spring 20 and swings the arcuate portion 10 of the hook 9 downwardly from the position of Fig. 1 to that of Fig. 2. This movement compresses the spring 20. During this swinging motion of the hook 9, when the extension 12 passes below a horizontal position, the free end 11 of the arcuate portion 10 of the hook 9 will be pointing in a slightly upward direction.

The bail 21 will therefore gravitate out of the notch 14 and beyond the end of the extension 12, and will fall into the space 13 where it will be supported by the bill 10 of the hook (Fig. 2) during hoisting operation. When the load is subsequently set down, the spring 20 will expand and retrieve the hook 9 to its normal position, (Fig. 1), and this retrieving motion will withdraw the arcuate 10 of the hook from its engagement with the bail 21.

Figure 1:
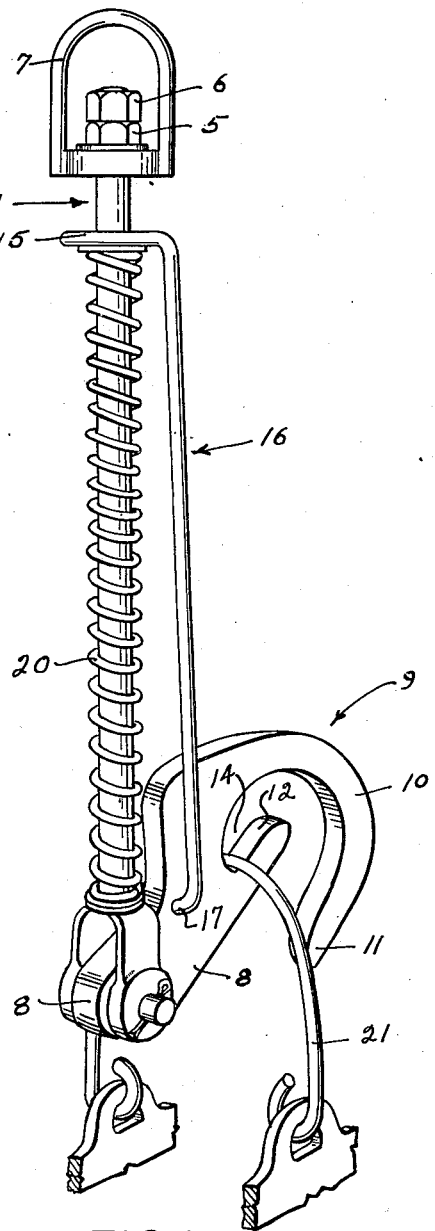
Figure 1 is a perspective view of the device, with the hook and its associated movable parts, shown in the positions they normally assume when not supporting a load.
Figures 3, 4:
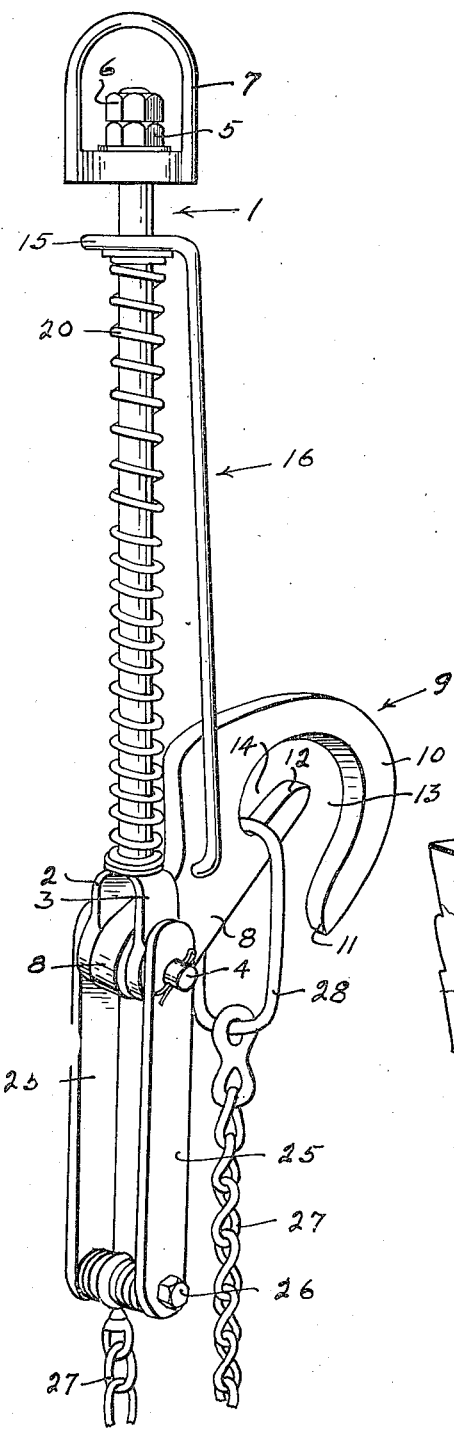
Figure 3 is a view similar to Fig. 1, but showing a load engaging attachment for engaging bulky objects; and, Figure 4 is a view similar to Fig. 2, showing the device of Fig. 3 as it appears when supporting a load.

In Figs. 3 and 4 is illustrated an embodiment of the invention which is designed to handle objects or loads which are not equipped with any hook engaging loop or bail, such as the bail 21 of Figs. 1 and 2. The structure of this latter embodiment has all of the parts hereinabove described, and in addition thereto includes the following described elements.

Pivotally mounted on the outer end portions of the pivot pin 4, and outside of the legs 2 and 3 of the body 1, are two strap-like links 25. The lower ends of the links are alignedly perforated to receive a horizontally disposed pin or bolt 26. A chain 27 has one of its ends mounted upon the bolt 26 between the links 25, and its other end is equipped with an elongated link or loop 28.

When lumber, pipe, or other bulky bailless objects are to be hoisted, the chain 27 is looped around the object to be hoisted, and the link 28 is placed in the notch 14 of the hook in the same manner as described hereinabove with relation to the bail 21. When the device is subsequently picked up by the hoisting line, the device functions in substantially the same manner as described with relation to Figs. 1 and 2, except that the link 28 acts in lieu of the bail 21.

The links 25 and chain 27 may be removed or installed at will to suit the type of objects to be hoisted, but if both bailed and bailless objects are to be hoisted intermittently, the chain may be left in place, since it will not prevent the device from being used upon bailed objects as first described hereinabove.

It is thought to be obvious that the device as described hereinabove, and shown in the drawings, will accomplish all of the objects and purposes set forth.

I claim:

1. In hoisting apparatus: a rod; a hook pivotally secured to said rod; a link pivotally engaging said hook and slidably mounts on said rod; and an expansible coil spring enclosing said rod and terminally engaging the link to normally hold the hook in disengaging position, the hook being moved into and held in holding position by drag thereon of an article being lifted.

2. Organization as described in claim 1, in which the shank of the hook has an extension projecting toward but not into contact with the bill thereof, the extension and bill forming a notch for receiving a load lifting loop-like element when the hook is in its normal disengaging position.

3. Organization as described in claim 1, and: a flexible load engaging element attached to the rod below the pivot point of said hook; and a loop carried by the free end of said element for engaging the hook after the element has been looped about an object to be hoisted.

4. In hoisting apparatus: an elongated body; a hook pivotally secured to said body, and adapted to be moved into and be held in load supporting position by drag thereon of a load being lifted; a link pivotally engaging said hook and slidably engaged with the body; and spring means for sliding the link along the body and moving the hook to a disengaging position when the weight of the load is no longer supported by the hook.

5. In hoisting apparatus: an elongated body; a hook pivotally secured to said body, and adapted to be moved into and be held in load supporting position by drag thereon of a load being lifted; a link pivotally engaging said hook and slidably engaged with the body; and an expansible coil spring enclosing said body and terminally engaging said link for moving the hook to a disengaging position when the weight of the load is no longer supported by the hook.

6. Organization as described in claim 4, and: a flexible load engaging element attached to the body below the pivot point of said hook; and a loop carried by the free end of said element for engaging the hook after the element has been looped about an object to be hoisted.

7. Organization as described in claim 5, and: a flexible load engaging element attached to the body below the pivot point of said hook; and a loop carried by the free end of said element for engaging the hook after the element has been looped about an object to be hoisted.

8. Organization as described in claim 4, in which the shank of the hook has an extension projecting toward but not into contact with the bill thereof, the extension and bill forming a notch for receiving a load-lifting loop-like element when the hook is in its normal disengaging position.

9. Organization as described in claim 5, in which the shank of the hook has an extension projecting toward but not into contact with the bill thereof, the extension and bill forming a notch for receiving a load lifting loop-like element when the hook is in its normal disengaging position.

JACK HERMAN.